US012304790B1

(12) United States Patent
Peeler et al.

(10) Patent No.: US 12,304,790 B1
(45) Date of Patent: May 20, 2025

(54) CLAMP ADAPTER FOR LIFT VEHICLE TO FACILITATE LIFTING OF MALLEABLE OBJECTS

(71) Applicant: SHAW INDUSTRIES GROUP, INC., Dalton, GA (US)

(72) Inventors: Christopher Mark Peeler, El Segundo, CA (US); Timothy J. Bass, Yorba Linda, CA (US)

(73) Assignee: SHAW INDUSTRIES GROUP, INC., Dalton, GA (US)

( * ) Notice: Subject to any disclaimer, the term of this patent is extended or adjusted under 35 U.S.C. 154(b) by 282 days.

(21) Appl. No.: 17/813,460

(22) Filed: Jul. 19, 2022

Related U.S. Application Data

(60) Provisional application No. 63/223,754, filed on Jul. 20, 2021.

(51) Int. Cl.
*B66F 9/18* (2006.01)
*B66F 9/20* (2006.01)

(52) U.S. Cl.
CPC ................ *B66F 9/184* (2013.01); *B66F 9/20* (2013.01)

(58) Field of Classification Search
CPC ................................. B66F 9/184; B66F 9/187
See application file for complete search history.

(56) References Cited

U.S. PATENT DOCUMENTS 3,145,866 A 8/1964 Farmer et al.
3,197,053 A 7/1965 Faust
3,221,840 A 12/1965 Weinert
3,291,518 A 12/1966 Weinert
3,314,562 A 4/1967 Farmer
3,326,593 A 6/1967 Farmer et al.
3,372,822 A 3/1968 Weinert
3,382,771 A 5/1968 Nutter
3,400,965 A 9/1968 Olson
3,407,951 A 10/1968 Faust et al.
3,410,431 A * 11/1968 Vik ......................... B66F 9/184 414/607
3,552,425 A 1/1971 Olson
3,567,054 A 3/1971 Emke
3,610,672 A 10/1971 Olson
3,648,972 A 3/1972 Olson
3,675,803 A 7/1972 Baughman
3,690,714 A 9/1972 Farmer
3,695,506 A 10/1972 Cook
3,706,350 A 12/1972 Bokovoy
(Continued)

*Primary Examiner* — Jonathan Snelting
(74) *Attorney, Agent, or Firm* — Lathrop GPM LLP; Laura Labeots

(57) ABSTRACT

A clamp adaptor is mountable on a bale squeeze attachment of a lift vehicle or truck to allow the lift vehicle or truck to lift a filled or partially-filled malleable bag. The clamp adaptor has first and second symmetrically mirrored opposing clamp-sides, each having a part-cylindrical side wall with a curvature about a vertical axis and a flat part-circular bottom plate fixedly coupled with the part-cylindrical side wall. The clamp adaptor also includes at least one stopper bar attached to one of the first and second symmetrically mirrored opposing clamp-sides to stop the first and second symmetrically mirrored opposing clamp-sides from moving closer than a minimum distance to prevent damage to a bag between the first and second symmetrically mirrored opposing clamp-sides.

19 Claims, 6 Drawing Sheets

(56) References Cited

U.S. PATENT DOCUMENTS

| | | | | |
|---|---|---|---|---|
| 3,709,547 | A | 1/1973 | Nutter | |
| 3,738,520 | A | 6/1973 | Didtel | |
| 3,782,409 | A | 1/1974 | House et al. | |
| 3,796,016 | A | 3/1974 | Wu | |
| 3,854,606 | A | 12/1974 | Hayes et al. | |
| 3,878,769 | A | 4/1975 | Farmer | |
| 3,918,741 | A | 11/1975 | Olson et al. | |
| 3,918,742 | A | 11/1975 | Gaibler et al. | |
| 3,934,720 | A | 1/1976 | Kratochvil, Jr. | |
| 3,984,010 | A | 10/1976 | Woloveke et al. | |
| 3,990,594 | A | 11/1976 | Olson | |
| 4,008,648 | A | 2/1977 | Farmer et al. | |
| 4,008,791 | A | 2/1977 | Shafii-Kahany et al. | |
| 4,008,875 | A | 2/1977 | Olson et al. | |
| 4,041,839 | A | 8/1977 | Olson | |
| 4,127,205 | A | 11/1978 | Farmer et al. | |
| 4,161,256 | A | 7/1979 | Seaberg | |
| 4,180,620 | A | 7/1979 | Farmer et al. | |
| 4,165,008 | A | 8/1979 | Faust et al. | |
| 4,177,000 | A | 12/1979 | Weinert et al. | |
| 4,185,944 | A | 1/1980 | Seaberg | |
| 4,191,092 | A | 3/1980 | Farmer | |
| 4,191,276 | A | 3/1980 | Farmer et al. | |
| 4,205,938 | A | 6/1980 | Olson | |
| 4,209,280 | A | 6/1980 | Bittner | |
| 4,221,526 | A | 9/1980 | Crandall | |
| 4,224,657 | A | 9/1980 | Olson | |
| 4,227,850 | A | 10/1980 | Farmer et al. | |
| 4,230,434 | A | 10/1980 | Seaberg | |
| 4,238,004 | A | 12/1980 | Olson | |
| 4,261,438 | A | 4/1981 | Olson | |
| 4,274,794 | A | 6/1981 | Olson | |
| 4,279,564 | A | 7/1981 | Weinert | |
| 4,284,384 | A | 8/1981 | Olson | |
| 4,297,070 | A | 10/1981 | Didtel | |
| 4,337,692 | A | 7/1982 | Sifri et al. | |
| 4,406,575 | A | 9/1983 | Gaibler | |
| 4,435,117 | A | 3/1984 | House | |
| 4,435,119 | A | 3/1984 | House | |
| 4,482,286 | A | 11/1984 | Farmer et al. | |
| 4,487,218 | A | 12/1984 | Sifri | |
| 4,624,620 | A | 11/1986 | Farmer et al. | |
| 4,682,931 | A | 7/1987 | House | |
| 4,699,565 | A | 10/1987 | Seaberg | |
| 4,708,575 | A | 11/1987 | Farmer et al. | |
| 4,752,179 | A | 6/1988 | Seaberg | |
| 4,782,920 | A | 11/1988 | Gaibler et al. | |
| 4,861,223 | A | 8/1989 | Olson | |
| 4,902,190 | A | 2/1990 | House | |
| 4,927,320 | A | 5/1990 | Olson | |
| 5,096,363 | A | 3/1992 | Weinert et al. | |
| 5,336,039 | A | 8/1994 | House | |
| 5,417,464 | A | 5/1995 | Seaberg et al. | |
| 5,927,932 | A | 7/1999 | Seaberg | |
| 5,984,617 | A | 11/1999 | Seaberg | |
| 6,089,285 | A * | 7/2000 | DeStefano | B66F 9/06 141/82 |
| 6,135,704 | A | 10/2000 | Seaberg | |
| 6,319,849 | B1 | 11/2001 | Seaberg | |
| 6,390,751 | B2 | 5/2002 | Jordan et al. | |
| 6,390,763 | B1 | 5/2002 | Prentice | |
| 6,431,816 | B1 | 8/2002 | Jordan et al. | |
| 6,439,826 | B1 | 8/2002 | Jordan et al. | |
| 6,454,511 | B1 | 9/2002 | Jordan et al. | |
| 6,572,082 | B1 | 6/2003 | Dixon et al. | |
| 6,672,823 | B2 | 1/2004 | Henning | |
| 6,843,636 | B2 | 1/2005 | Jordan | |
| 7,008,167 | B2 | 3/2006 | Henning | |
| 7,018,159 | B2 | 3/2006 | Jordan | |
| 7,056,078 | B2 | 6/2006 | Seaberg | |
| 7,824,144 | B2 * | 11/2010 | Wilson | B62B 5/0003 280/47.15 |
| 7,909,563 | B2 | 3/2011 | Prentice | |
| 8,078,315 | B2 | 12/2011 | McKernan et al. | |
| 8,091,467 | B2 | 1/2012 | Petronek | |
| 8,403,618 | B2 | 3/2013 | Prentice et al. | |
| D683,925 | S | 6/2013 | Dickinson et al. | |
| D684,334 | S | 6/2013 | Dickinson et al. | |
| D684,335 | S | 6/2013 | Dickinson et al. | |
| 8,517,440 | B1 | 8/2013 | Dal Dosso et al. | |
| 8,568,079 | B2 | 10/2013 | Nalthers et al. | |
| D702,412 | S | 4/2014 | Osso et al. | |
| 8,714,610 | B2 | 5/2014 | Dal Dosso et al. | |
| 8,752,846 | B1 | 6/2014 | White | |
| 8,755,929 | B2 | 6/2014 | McKernan et al. | |
| D709,417 | S | 7/2014 | Jordan | |
| D709,418 | S | 7/2014 | Jordan | |
| 8,781,617 | B2 | 7/2014 | McKernan et al. | |
| 8,781,618 | B2 | 7/2014 | McKernan et al. | |
| 8,979,154 | B2 | 3/2015 | Petronek | |
| 9,067,771 | B2 | 6/2015 | Running | |
| 9,114,963 | B2 | 8/2015 | McKernan et al. | |
| 9,139,407 | B2 | 9/2015 | McKernan et al. | |
| 9,290,367 | B2 | 3/2016 | Lyda | |
| 9,309,099 | B2 | 4/2016 | Dal Dosso et al. | |
| 9,321,619 | B2 | 4/2016 | Wang et al. | |
| RE46,172 | E | 10/2016 | Dal Dosso et al. | |
| 9,525,288 | B2 | 12/2016 | McKernan et al. | |
| 9,850,080 | B1 | 12/2017 | Dal Dosso et al. | |
| 9,935,469 | B2 | 4/2018 | McKernan et al. | |
| 9,964,428 | B2 | 5/2018 | Petronek | |
| 10,011,468 | B2 | 7/2018 | White et al. | |
| 10,017,366 | B2 | 7/2018 | Running | |
| 10,087,958 | B2 | 10/2018 | McKernan | |
| 10,131,525 | B2 | 11/2018 | White | |
| 10,168,202 | B2 | 1/2019 | Richards | |
| 10,377,617 | B2 | 8/2019 | Schindlbeck et al. | |
| 10,494,241 | B2 | 12/2019 | Petronek | |
| 10,525,997 | B1 * | 1/2020 | Su | B62B 1/142 |
| 10,550,886 | B2 | 2/2020 | Sweeney et al. | |
| 2003/0233184 | A1 | 12/2003 | Roncari | |
| 2009/0116945 | A1 | 5/2009 | White et al. | |
| 2010/0021275 | A1 * | 1/2010 | Ratermann | B62B 1/14 414/454 |
| 2017/0267505 | A1 | 9/2017 | Running | |
| 2018/0155171 | A1 | 6/2018 | Walthers | |
| 2018/0212434 | A1 | 7/2018 | McKernan | |
| 2018/0252572 | A1 | 9/2018 | Petronek | |
| 2018/0312384 | A1 | 11/2018 | White et al. | |
| 2018/0363682 | A1 | 12/2018 | McKernan et al. | |
| 2019/0023547 | A1 | 1/2019 | Andriolo et al. | |
| 2019/0241417 | A1 | 8/2019 | Prentice et al. | |

* cited by examiner

CLAMP ADAPTER FOR LIFT VEHICLE TO FACILITATE LIFTING OF MALLEABLE OBJECTS

CROSS REFERENCE TO RELATED APPLICATIONS

This application claims the priority benefit of U.S. Provisional Patent Application Ser. No. 63/223,754, filed Jul. 20, 2021. The entirety of this application is hereby incorporated by reference for all purposes.

BACKGROUND

A lift vehicle or truck can be fitted with a bale squeeze attachment to allow the lift vehicle or truck to move solid objects, such as straw bales. The bale squeeze attachment generally has two independently movable, solid, flat plates that are substantially parallel to each other and oppose each other in horizontal alignment. A lift vehicle or truck operator can control the horizontal movement of the two flat plates, moving them closer and further apart from one another in order to grasp an object between the flat plates (e.g., a bale) and release the object. In moving the flat plates closer together, a force is applied, which results in sufficient friction and pressure between the flat plates and the object to allow the lift vehicle or truck to grasp, squeeze, and lift the object. As such, commercially available bale squeeze attachments are suitable for grasping and lifting substantially rigid, cuboid objects. However, these attachments don't work particularly well in grasping and lifting malleable or soft objects because the two flat plates cannot apply sufficient force to grasp the malleable object without substantially deforming and damaging the malleable object. Thus, there exists a need for a lift vehicle or truck attachment that can grasp and lift malleable objects, such as filled or partially-filled lint bags.

SUMMARY

The flat plates of a commercially available bale squeeze attachment for a lift vehicle or truck may easily burst a lint bag, or other malleable object, when grasping and trying to lift the malleable object. One reason for the damage is that the lint bag is easily deformed and there is no significant resistance to being squeezed by the flat plates, so the lint bag is easily burst. The present embodiments solve this problem by replacing at least one of the flat plates with a part-cylindrical side wall having a curvature that is similar to the curvature of the lint bag when full. Advantageously, the part-cylindrical side wall reduces the deformation of the lint bag when being squeezed for lifting, thereby reducing the likelihood of bursting.

However, even with two part-cylindrical side walls, when the part-cylindrical side walls are moved too close to one another, the lint bag may still burst due to excessive applied pressure from the side walls. The present embodiments solve this problem by including at least one stopper bar that prevents the part-cylindrical side walls from moving too close to one another. Advantageously, this limits the lint bag from being grasped and squeezed too tightly and thereby prevents the lint bag from being burst by the part-cylindrical side walls.

Additionally, by using at least one stopper bar to prevent the two part-cylindrical side walls from moving too close together when the lint bag is less full, the lint bag is not gripped as tightly and may therefore slip from the part-cylindrical side walls after the lint bag is lifted by the lift vehicle or truck. The present embodiments solve this problem by including at least one flat part-circular bottom plate fixedly coupled to at least one of the part-cylindrical side walls. Advantageously, the at least one flat part-circular bottom plate prevents the lint bag from slipping out from between the part-cylindrical side walls when lifted by the lift vehicle or truck.

In certain embodiments, a clamp adaptor mounts on a bale squeeze attachment of a lift vehicle or truck. The clamp adaptor includes: a) first and second opposing clamp-sides, each comprising: i) a part-cylindrical side wall having a first curvature with a radius about a vertical axis of the clamp adaptor; ii) a top bracket having a flat portion with a part-circular shape edge that fixedly couples at a first end with an outside portion of the part-cylindrical side wall at a first height, and having a vertical portion with attachment means at a second end, opposite the first end, that removably attach to one vertical side plate of the bale squeeze attachment; and iii) a bottom bracket having a flat portion with a part-circular shape edge that fixedly couples at a first end with an outside portion of the part-cylindrical side wall at a second height, lower than the first height, and a vertical portion having attachment means at a second end, opposite the first end, that removably attach to the one vertical side plate of the bale squeeze attachment; and b) at least one stopper bar attached to one of the first and second opposing clamp-sides. The first and second opposing clamp-sides are laterally independently movable by the bale squeeze attachment from a minimum separation distance defined by the at least one stopper bar to a maximum separation distance defined by the bale squeeze attachment, and the at least one stopper bar is sized to prevent the bale squeeze attachment from closing the first and second opposing clamp-sides beyond a reset minimum distance.

In certain embodiments, a clamp adaptor mounts on a bale squeeze attachment of a lift vehicle or truck to allow the lift vehicle or truck to lift a filled or partially filled malleable bag or similar container. The clamp adaptor comprising first and second opposing clamp-sides, each clamp-side having: a part-cylindrical side wall having a curvature with a radius about a vertical axis of the bag handling clamp adaptor; and a flat part-circular bottom plate fixedly coupled with the part-cylindrical side wall.

DETAILED DESCRIPTION OF THE EMBODIMENTS

Figure 1:
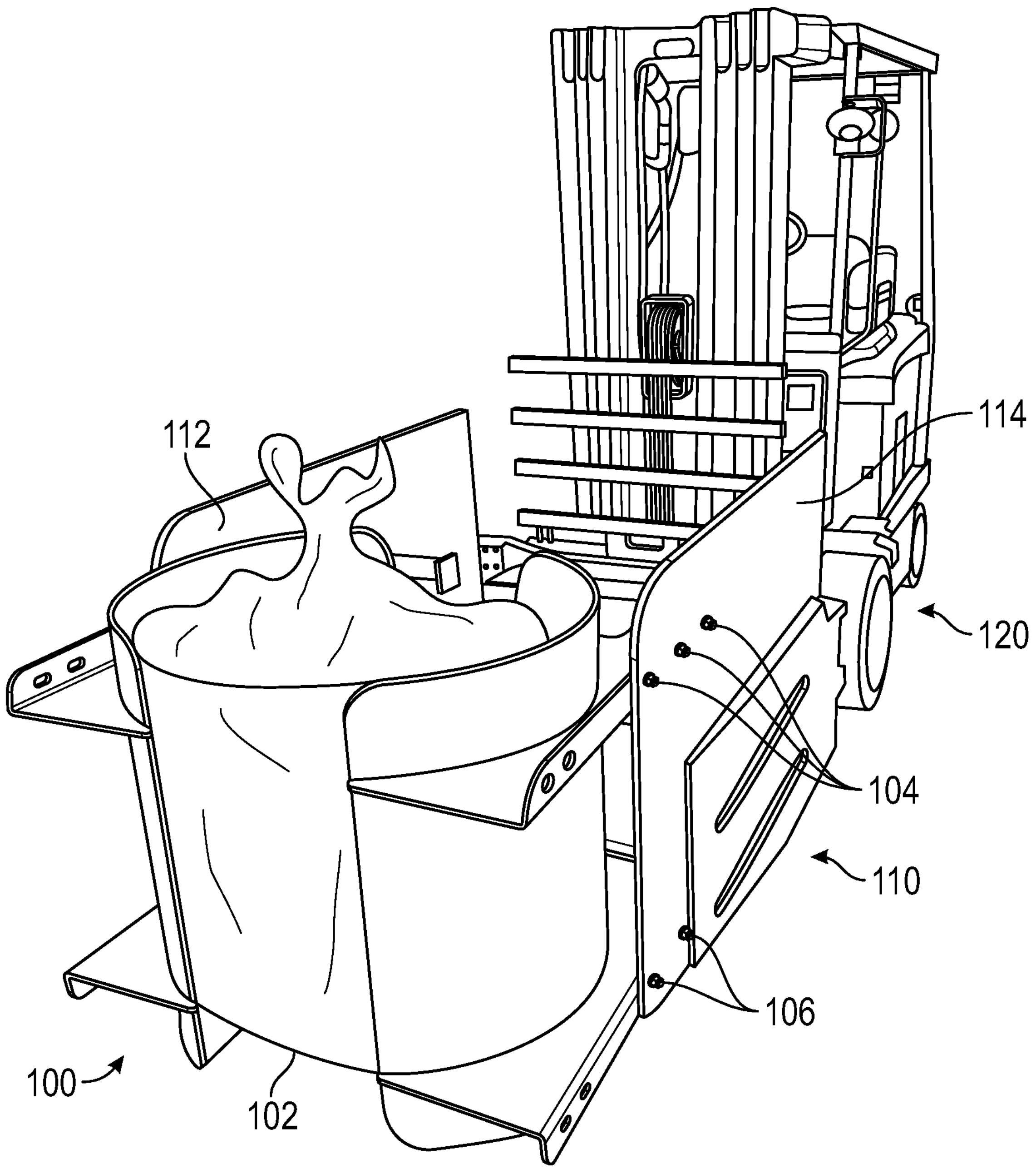
FIG. 1 shows one example clamp adapter, attached to a bale squeeze attachment of a lift vehicle or truck, for lifting a filled or partially-filled malleable bag.

FIG. 1 shows one example clamp adapter 100, attached to a bale squeeze attachment 110 of a lift vehicle or truck 120. Clamp adapter 100 is shown containing a filled, malleable bag or similar container 102 in preparation for being grasped and lifted by the lift vehicle or truck 120. Clamp adapter 100 enables lift vehicle or truck 120 to lift a soft, deformable object, such as a malleable bag 102. For example, malleable bag 102 may contain a soft and/or loose material that allows malleable bag 102 to deform when squeezed for lifting as flat plates 112 and 114 are closed around malleable bag 102. In one example, malleable bag 102 is filled with lint captured during carpet manufacture. Lint bag are made from any suitable malleable material, including man-made or natural materials, such as plastics, polymers, natural and/or synthetic fabrics, or mixtures thereof. In most cases, the malleable bag is sealed or closed or secured so that the contents are retained within the bag. The size of the bag can be variable and in one embodiment is about 28-34 inches in diameter and about 48 inches high. Other malleable objects or non-malleable objects can likewise be grasped and lifted by the clamp adapter 100 as well.

Advantageously, clamp adapter 100 may be attached to bale squeeze attachment 110 by any convenient means, including screws or bolts 104, 106 to allow the operator to use lift vehicle or truck 120 to lift malleable bag 102 without significantly deforming or substantially damaging malleable bag 102. Development of this clamp adapter 100 has solved many problems associated with lifting malleable objects including dropping the objects, ripping, or otherwise damaging the malleable objects.

Figure 2:
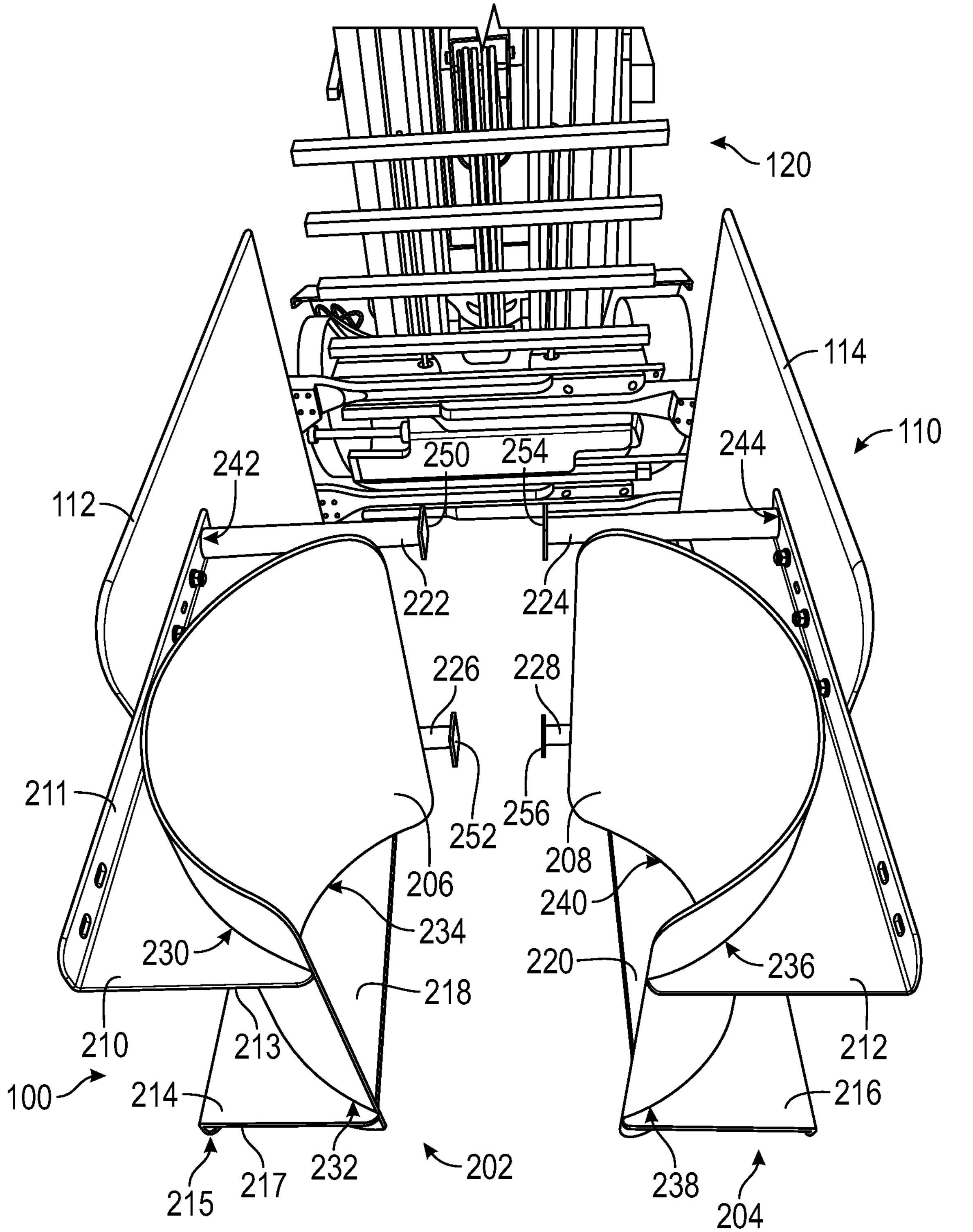
FIG. 2 is a front perspective view showing further example detail of the clamp adapter of FIG. 1.
Figure 3:
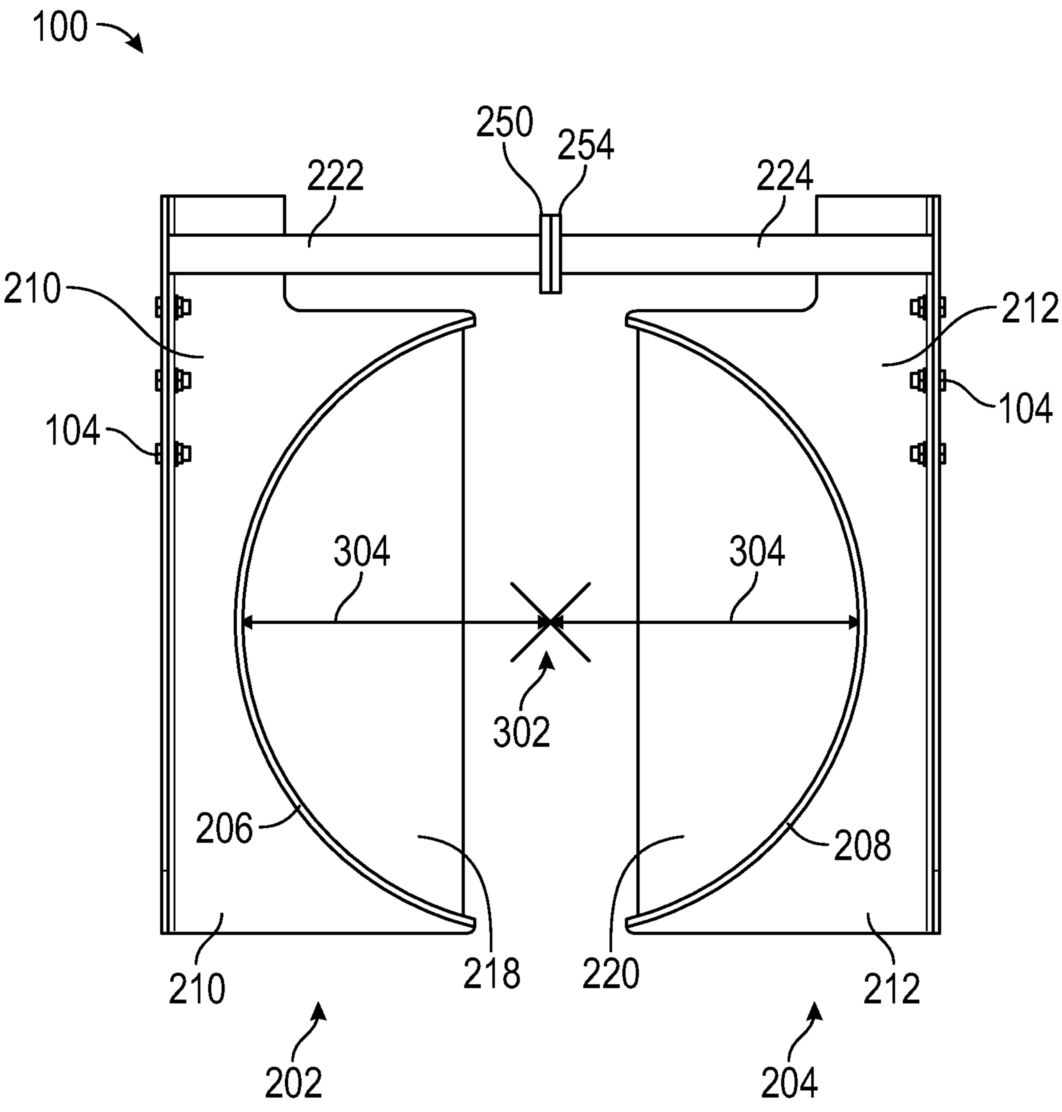
FIG. 3 is a top view of the bag handling clamp adapter of FIGS. 1 and 2.
Figure 4:
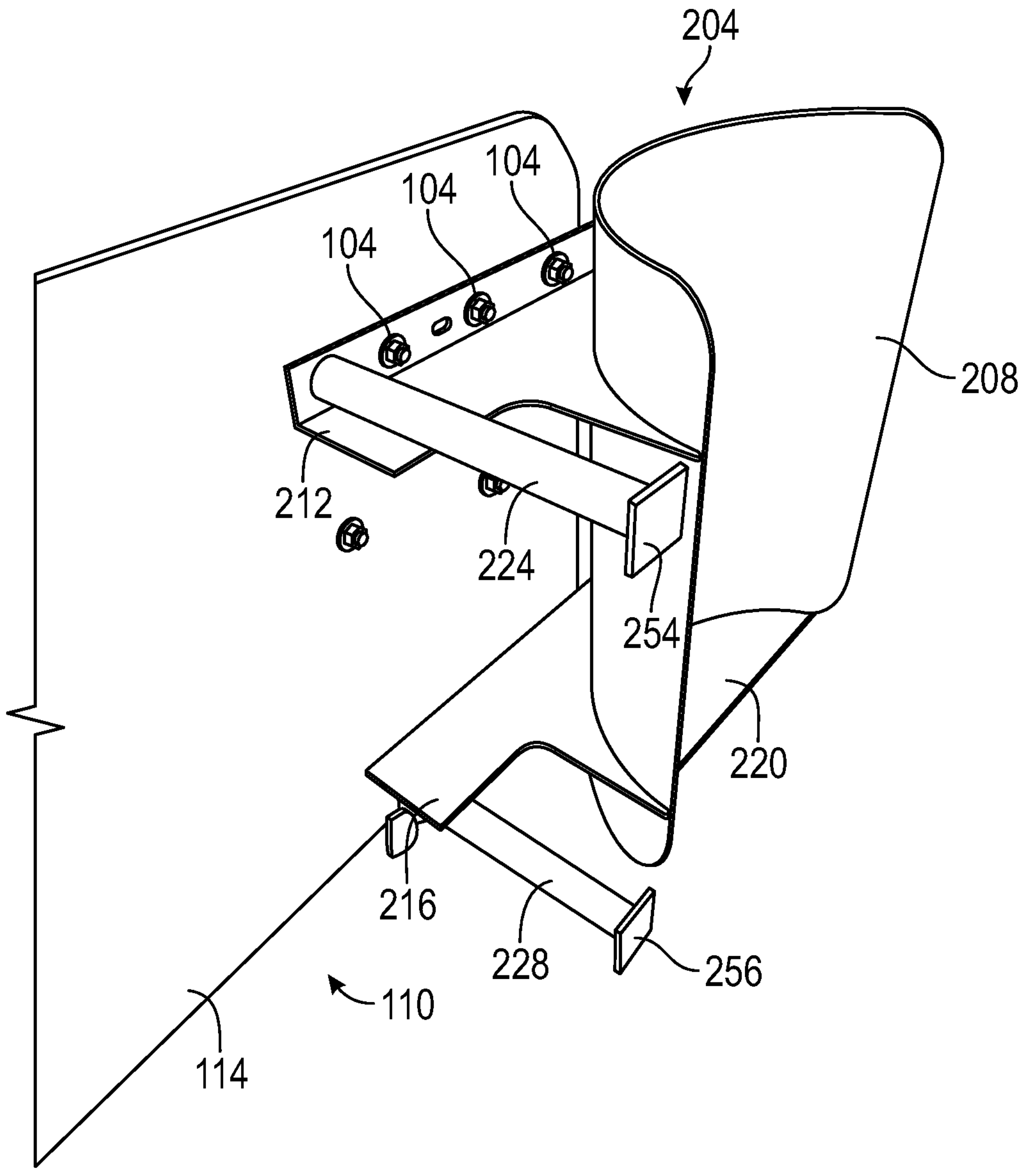
FIG. 4 is a rear perspective view showing the left clamp of the clamp adapter of FIGS. 1, 2, and 3 in further example detail.
Figure 5:
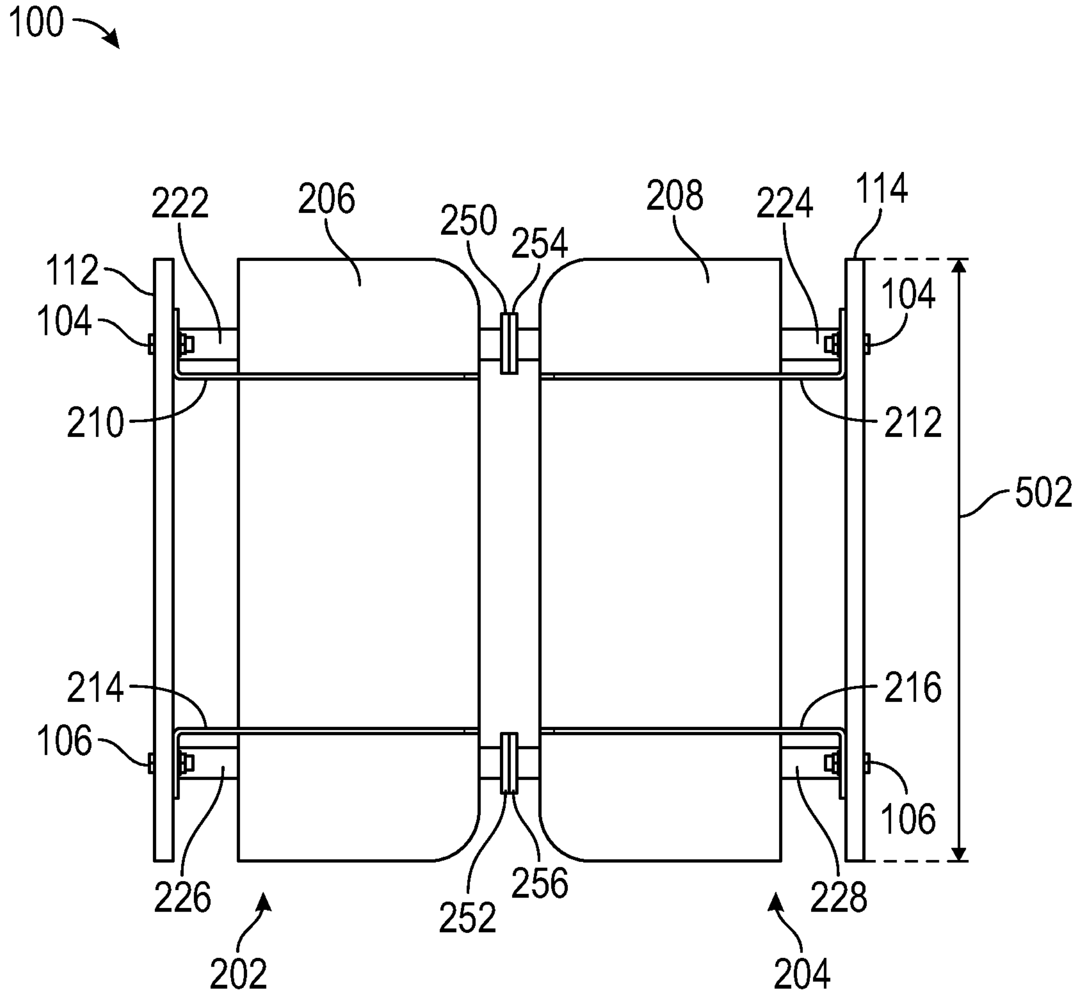
FIG. 5 is a front elevation of clamp adapter of FIGS. 1-4.
Figure 6:
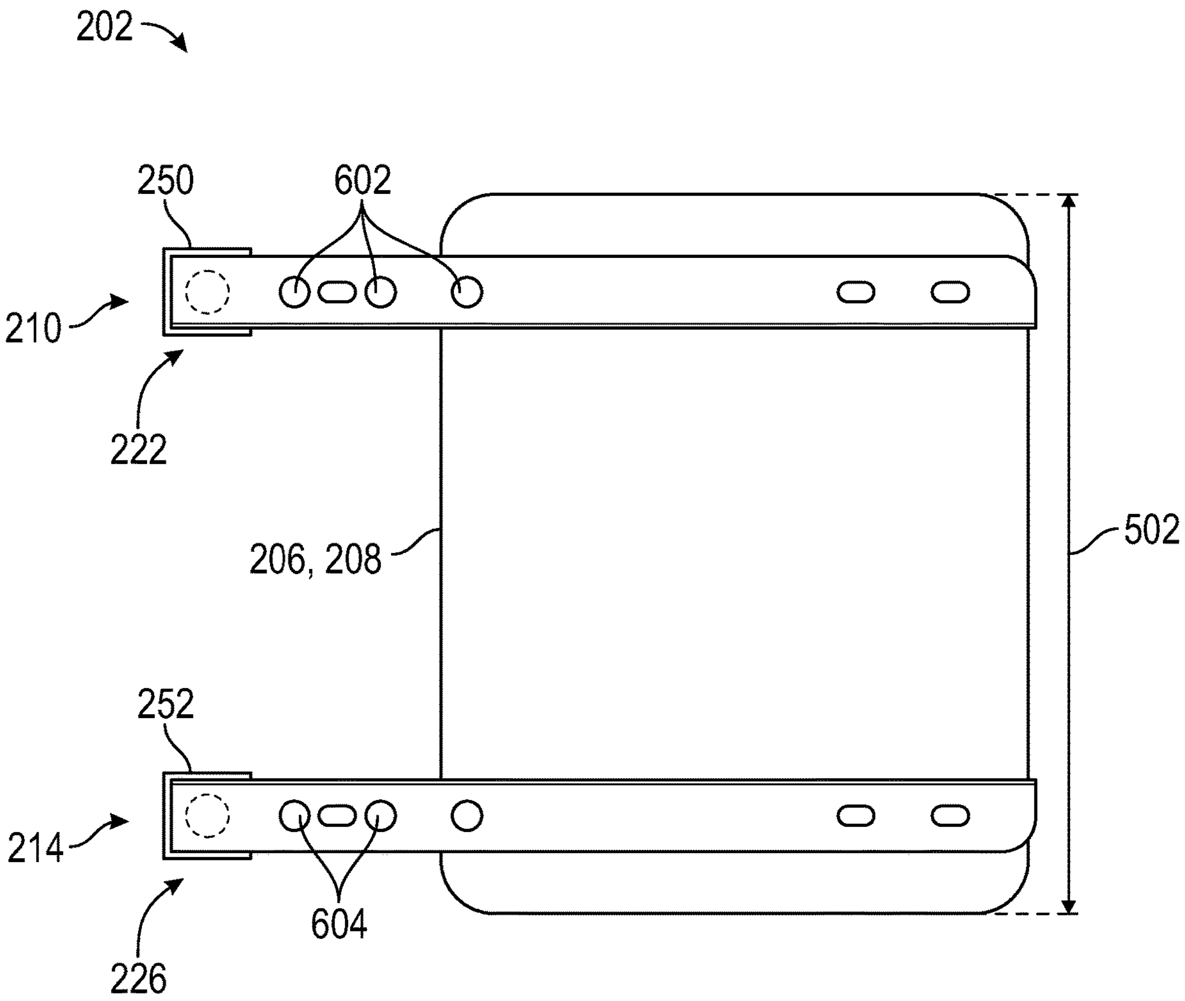
FIG. 6 is a side elevation of clamp adapter of FIG. 5.

FIGS. 2-6 are best viewed together with the following description. Only right clamp 202 is described in detail, however, the description of right clamp 202 can equally apply to left clamp 204 with the appropriate symmetrical translation in some embodiments. FIG. 2 is a front perspective view showing further example detail of the clamp adapter 100. The clamp adapter 100 has, from the perspective of an operator of lift vehicle or truck 120, a right clamp 202 and a left clamp 204 that are symmetrical. The right and left clamps 202, 204 can also be non-symmetrical FIG. 3 is a top elevation of the clamp adapter 100 of FIGS. 1 and 2. FIG. 4 is a rear perspective view showing left clamp 204 in further example detail. FIG. 5 is a front elevation of the clamp adapter 100 of FIGS. 1-4. FIG. 6 is a side elevation of the clamp adapter 100 of FIGS. 1-4.

In FIGS. 2 and 3, right clamp 202 includes a part-cylindrical side wall 206 having a radius 304 of curvature of about a vertical axis 302 of the clamp adapter 100. A height 502 of part-cylindrical side wall 206 is selected based on a size of the object to be lifted, such as a malleable bag 102. In one embodiment shown in FIGS. 5 and 6, radius 304 is fourteen and one-quarter inches and height 502 is thirty-six inches. However, radius 304 may be within the range of seven to twenty-one inches, and height 502 may be within a range of eighteen to fifty-four inches. Part-cylindrical side wall 206 is less than half of a cylinder. Right clamp 202 also includes a flat part-circular bottom plate 218, having a similar radius 304 of curvature, fixedly coupled (e.g., welded at seam 234) with a bottom edge of part-cylindrical side wall 206. Flat part-circular bottom plate 218 is less than a semi-circle. As shown, flat part-circular bottom plate 218 does not completely fill the open end of part-cylindrical side wall 206. This prevents flat part-circular bottom plate 218 from damaging malleable bag 102 when closing right and left clamps 202, 204 around malleable bag 102, but covers a sufficient portion of the open end of part-cylindrical side wall 206 to prevent malleable bag 102 from slipping out from between part-cylindrical side walls 206 and 208.

Right clamp 202 also includes a top bracket or plate 210 formed from a substantially rectangular plate with a first long edge 211 formed (e.g., folded) at a 90-degree angle and a second edge, opposite the first edge, having a part-circular cutout corresponding to radius 304 (e.g., allowing for material thickness of part-cylindrical side wall 206) towards a front edge 213. In one embodiment, top bracket 210 has a length of thirty-six inches and a maximum width of fifteen inches tapering to a width of thirteen inches at a front edge. However, top bracket 210 hay have a length in the range of eighteen to fifty-four inches, and a width ranging between six and nineteen inches. Top bracket 210 is positioned in a horizontal plane and fixedly coupled (e.g., welded at seam 230, as shown in FIG. 2) with an outside surface of part-cylindrical side wall 206 near, but not at, a top edge of part-cylindrical side wall 206. First long edge 211 (e.g., the folded portion) of top bracket 210 includes attachment means, such as a plurality of apertures 602 (e.g., three slots) in a horizontal plane to allow removable coupling (e.g., using one or more of bolts, pins, etc.) of top bracket 210 with flat plate 112 of bale squeeze attachment 110. Top bracket 210 may also include a stopper bar 222.

Right clamp 202 also includes a bottom bracket or plate 214 formed from a substantially rectangular plate with a first long edge 215 formed (e.g., folded) at a 90-degree angle and a second edge, opposite the first edge, having a part-circular cutout corresponding to radius 304 (e.g., allowing for material thickness of part-cylindrical side wall 206) towards a front edge 217. Bottom bracket 214 is positioned in a horizontal plane and fixedly couples (e.g., welded at seam 232, as shown in FIG. 2) with an outside surface of part-cylindrical side wall 206 and near to, but not at, a bottom edge of part-cylindrical side wall 206. First long edge 215 (e.g., the folded portion) of bottom bracket 214 includes attachment means, such as a plurality of apertures 604 (e.g., two slots) in a horizontal plane to allow removable coupling (e.g., using one or more of bolts, pins, etc.) of bottom bracket 214 with flat plate 112 of bale squeeze attachment 110. Right clamp 202 may be attached at several different horizontal locations along flat plate 112 as needed. In one embodiment, top bracket 210 and bottom bracket 214 each extend sixteen inches forward of a front edge of flat plate 112. However, top bracket 210 and bottom bracket 214 may each extend between eight and twenty-four inches forward of the front edge of flat plate 112. For example, top bracket 210 and bottom bracket 214 may have additional apertures that provide different positions for right clamp 202 relative to flat plate 112. For example, as shown in FIGS. 1, 2 and 4, clamp adapter 100 is positioned at a front end of bale squeeze attachment 110; however, clamp adapter 100 may be positioned further back through use of the additional apertures.

Top bracket 210 and bottom bracket 214 are substantially parallel and positioned at two different heights relative to right clamp 202, such that when fixedly coupled with flat plate 112, top bracket 210 and bottom bracket 214 rigidly attach right clamp 202 to flat plate 112 of bale squeeze attachment 110. In one embodiment, a distance between a top surface of top bracket 210 and a bottom surface of bottom bracket 214 is twenty-eight inches. However, the distance between the top surface of top bracket 210 and the bottom surface of bottom bracket 214 may range between fourteen and forty-two inches.

Top bracket 210 also includes a stopper bar 222 that is fixedly attached (e.g., welded at seam 242) to an inside surface of folded edge 211 such that stopper bar 222 is perpendicular to folded edge 211. Stopper bar 222 is for example a tube with an end plate 250 attached at a distal end (e.g., furthest from folded edge 211). Bottom bracket 214 also include a stopper bar 226 that is fixedly attached (e.g., welded) to an inside surface of folded edge 215. Stopper bar 226 is for example a tube with an end plate 252 attached at a distal end (e.g., furthest from folded edge 215). In one embodiments, when flat plates 112, 114 of bale squeeze attachment 110 are closed (see FIG. 3) such that clamp adapter 100 is closed with end plates 250 and 254 of stopper bars 222 and 224 meeting, clamp adapter 100 has a front opening, at a front edge of top brackets 210 and 212 and part-cylindrical side walls 206 and 208, of nine inches and a rear opening, a rear edge of top brackets 210 and 212 and part-cylindrical side walls 206 and 208, of four-and-a-quarter inches. However, when clamp adapter 100 is closed, the front opening may range between four and fourteen inches, and the rear opening may range between two and seven inches. When closed, an overall width of clamp adapter 100 is thirty-five inches. However, the overall width of clamp adapter 100 may be between eighteen and fifty-four inches.

As noted above, left clamp 204 is a mirror of right clamp 202 and includes top bracket 212 fixedly attached (e.g., welded at seam 236) to part-cylindrical side wall 208, bottom bracket 216 fixedly attached (e.g., welded at seam 238) to part-cylindrical side wall 208, a flat part-circular bottom plate 220 fixedly attached (e.g., welded at seam 240) to part-cylindrical side wall 208, stopper bar 224 fixedly attached (e.g., welded at seam 244) to top bracket 212, and stopper bar 228 fixedly attached (e.g., welded) to bottom bracket 216, each stopper bar 224, 228 with corresponding end plates 254 and 256, respectively.

Part-cylindrical side wall 206 and part-cylindrical side wall 208 may have other shapes without departing from the scope hereof. For example, part-cylindrical side wall 206 and part-cylindrical side wall 208 may be formed as a multi-faceted cylinder. In certain embodiments, part-cylindrical side wall 206 and part-cylindrical side wall 208 may be formed from a metal mesh.

Examples of Operation

During operation of lift vehicle or truck 120 and bale squeeze attachment 110, as flat plates 112 and 114 are closed around malleable bag 102, right clamp 202 and left clamp 204 are brought together until end plate 250 of the right clamp 202 contacts a corresponding end plate 254 of left clamp 204, and end plate 252 of the right clamp 202 contacts a corresponding end plate 256 of left clamp 204. As shown in FIG. 5, stopper bars 222 and 226 extend beyond part-cylindrical side wall 206, and stopper bars 224 and 228 extend beyond part-cylindrical side wall 208, and therefore stopper bars 222, 224, 226, and 228 prevent part-cylindrical side wall 206 and 208 from closing beyond a preset distance. This prevents clamp adapter 100 from bursting malleable bag 102 during normal operation of lift vehicle or truck 120 to move malleable bag 102.

In certain embodiments, stopper bars 222, 224, 226, and 228 may be adjustable (e.g., using a screw thread mechanism, or sliding tubes and lock bolts) prior to operation of lift vehicle or truck 120 to allow an operator to set the minimum close distance between part-cylindrical side walls 206 and 208 corresponding to a size of malleable bag 102 that is to be lifted.

In certain embodiments, inner surfaces of part-cylindrical side walls 206 and 208 are augmented to increase frictions between part-cylindrical side walls 206 and 208 and malleable bag 102, such as with one or more of a grip tape, a grip pad, and/or a grip rubber coating.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A clamp adaptor for mounting on a bale squeeze attachment of a lift vehicle, the clamp adaptor comprising:

a) first and second opposing clamp-sides, each comprising:

i) a part-cylindrical side wall having a first curvature with a radius about a vertical axis of the clamp adaptor;

ii) a top bracket having a flat portion with a part-circular shape edge that fixedly couples at a first end with an outside portion of the part-cylindrical side wall at a first height, and having a vertical portion with attachment means at a second end, opposite the first end, that removably attach to one vertical side plate of the bale squeeze attachment; and iii) a bottom bracket having a flat portion with a part-circular shape edge that fixedly couples at a first end with an outside portion of the part-cylindrical side wall at a second height, lower than the first height, and a vertical portion having attachment means at a second end, opposite the first end, that removably attach to the one vertical side plate of the bale squeeze attachment;

wherein the first and second opposing clamp-sides are independently movable; and b) at least one stopper bar attached to one of the first and second opposing clamp-sides;

wherein the first and second opposing clamp-sides are laterally movable by the bale squeeze attachment from a minimum separation distance defined by the at least one stopper bar to a maximum separation distance defined by the bale squeeze attachment; and wherein the at least one stopper bar is sized to prevent the bale squeeze attachment from closing the first and second opposing clamp-sides beyond a reset minimum distance.

2. The clamp adaptor of claim 1, wherein the first and second opposing clamp-sides further comprise a flat part-circular bottom plate having a second curvature with the same radius as the part-cylindrical side wall and wherein the flat part-circular bottom plate is fixedly coupled with a bottom edge of the part-cylindrical side wall.

3. The clamp adaptor of claim 1, wherein the first and second opposing clamp-sides are not symmetrically mirrored.

4. The clamp adaptor of claim 1, wherein the first and second opposing clamp-sides are symmetrically mirrored.

5. The clamp adaptor of claim 1, wherein the at least one stopper bar is adjustable in length.

6. The clamp adaptor of claim 1, further comprising a friction coating formed on an inner surface of at least one of the clamp-sides.

7. The clamp adaptor of claim 1, further comprising a pad on an inner surface of at least one of the clamp-sides.

8. A clamp adaptor for mounting on a bale squeeze attachment of a lift vehicle to allow the lift vehicle to lift a filled or partially filled malleable bag, the clamp adaptor comprising first and second opposing clamp-sides, each clamp-side having:

a part-cylindrical side wall having a curvature with a radius about a vertical axis of the clamp adaptor;

a flat part-circular bottom plate fixedly coupled with the part-cylindrical side wall; and at least one stopper bar attached to one of the first and second opposing clamp-sides to stop the first and second opposing clamp-sides from moving closer to each other relative to a minimum distance between the first and second opposing clamp-sides;

wherein the at least one stopper bar is adjustable in length.

9. The clamp adaptor of claim 8, wherein the at least one stopper bar lessens or prevents the first and second opposing clamp-sides from damaging the filled malleable bag.

10. The clamp adaptor of claim 8, wherein the first and second opposing clamp-sides are not symmetrically mirrored.

11. The clamp adaptor of claim 8, wherein the first and second opposing clamp-sides are independently movable.

12. The clamp adaptor of claim 8, wherein the first and second opposing clamp-sides are symmetrically mirrored.

13. The clamp adaptor of claim 8, further comprising:

at least one first bracket fixedly coupled at a first end with an outside portion of the part-cylindrical side wall of the first opposing clamp-side; and at least one second bracket fixedly coupled at a first end with an outside portion of the part-cylindrical side wall of the second opposing clamp-side;

wherein a second end, opposite the first end, of the at least one first bracket attaches to a first side of the bale squeeze attachment of the vehicle and a second end, opposite the first end, of the at least one second bracket attaches to a second side of the bale squeeze attachment; and wherein opening the bale squeeze attachment moves the first and second opposing clamp-sides away from each other and wherein closing the bale squeeze attachment moves the first and second opposing clamp-sides towards each other.

14. The clamp adaptor of claim 8, wherein each of the first and second opposing clamp-sides further comprises a top bracket having a flat portion with a part-circular shape edge that fixedly couples at a first end with an outside portion of the part-cylindrical side wall at a first height, and having a vertical portion with mounting holes at a second end, opposite the first end, for receiving bolts that removably attach the clamp-side to one vertical side plate of the bale squeeze attachment.

15. The clamp adaptor of claim 8, wherein the part-cylindrical side wall is less than half of a cylinder and wherein the flat part-circular bottom plate is less than a semi-circle.

16. The clamp adaptor of claim 8, further comprising a friction coating formed on an inner surface of at least one of the clamp-sides.

17. The clamp adaptor of claim 8, further comprising a pad on an inner surface of at least one of the clamp-sides.

18. A clamp adaptor for mounting on a bale squeeze attachment of a lift vehicle, the clamp adaptor comprising:

a) first and second opposing clamp-sides, each comprising:

i) a part-cylindrical side wall having a first curvature with a radius about a vertical axis of the clamp adaptor;

ii) a top bracket having a flat portion with a part-circular shape edge that fixedly couples at a first end with an outside portion of the part-cylindrical side wall at a first height, and having a vertical portion with attachment means at a second end, opposite the first end, that removably attach to one vertical side plate of the bale squeeze attachment; and iii) a bottom bracket having a flat portion with a part-circular shape edge that fixedly couples at a first end with an outside portion of the part-cylindrical side wall at a second height, lower than the first height, and a vertical portion having attachment means at a second end, opposite the first end, that removably attach to the one vertical side plate of the bale squeeze attachment; and b) at least one stopper bar attached to one of the first and second opposing clamp-sides;

wherein the first and second opposing clamp-sides are laterally movable by the bale squeeze attachment from a minimum separation distance defined by the at least one stopper bar to a maximum separation distance defined by the bale squeeze attachment;

wherein the at least one stopper bar is sized to prevent the bale squeeze attachment from closing the first and second opposing clamp-sides beyond a reset minimum distance; and wherein the at least one stopper bar is adjustable in length.

19. A clamp adaptor for mounting on a bale squeeze attachment of a lift vehicle to allow the lift vehicle to lift a filled or partially filled malleable bag, the clamp adaptor comprising first and second opposing clamp-sides, each clamp-side having:

a part-cylindrical side wall having a curvature with a radius about a vertical axis of the clamp adaptor; and a flat part-circular bottom plate fixedly coupled with the part-cylindrical side wall;

wherein the first and second opposing clamp-sides are independently movable.

* * * * *